United States Patent
Rijssemus et al.

(10) Patent No.: US 11,949,454 B2
(45) Date of Patent: Apr. 2, 2024

(54) OPTICAL NETWORK DEVICE

(71) Applicant: TECHNETIX B.V., Veenendaal (NL)

(72) Inventors: Martien Rijssemus, Veenendaal (NL); Matthijs Laro, Veenendaal (NL)

(73) Assignee: TECHNETIX B.V., Veenendaal (NL)

( * ) Notice: Subject to any disclaimer, the term of this patent is extended or adjusted under 35 U.S.C. 154(b) by 0 days.

(21) Appl. No.: 17/829,509

(22) Filed: Jun. 1, 2022

(65) Prior Publication Data
US 2022/0407603 A1  Dec. 22, 2022

(30) Foreign Application Priority Data
Jun. 21, 2021 (GB) .................................. 2108879.4

(51) Int. Cl.
*H04B 10/2575* (2013.01)
*H04B 10/25* (2013.01)

(52) U.S. Cl.
CPC . *H04B 10/25891* (2020.05); *H04B 10/25751* (2013.01)

(58) Field of Classification Search
CPC .............................................. H04B 10/25751
See application file for complete search history.

(56) References Cited

U.S. PATENT DOCUMENTS

| | | | | |
|---|---|---|---|---|
| 8,249,452 B2* | 8/2012 | Biegert | ............... | H04J 14/0282 398/58 |
| 8,346,081 B2* | 1/2013 | Mysore | ............ | H04B 10/25751 398/58 |
| 8,666,260 B2* | 3/2014 | Khalouf | ............... | H04B 10/504 398/201 |
| 8,798,470 B2* | 8/2014 | Boyd | ............... | H04B 10/25751 398/154 |
| 9,647,773 B2* | 5/2017 | Soto | ..................... | H04B 10/808 |
| 10,129,616 B2* | 11/2018 | Maricevic | ........ | H04B 10/25751 |
| 10,158,423 B2* | 12/2018 | Zinevich | .......... | H04B 10/25751 |

(Continued)

FOREIGN PATENT DOCUMENTS

| | | | | |
|---|---|---|---|---|
| CN | 1119793 A | | 4/1996 | |
| GB | 2600184 A | * | 4/2022 | ............... H03F 1/26 |

(Continued)

OTHER PUBLICATIONS

Microwave Power Dividers and Couplers Tutorial: Overview and Definition of Terms, 2011 (Year: 2011).*

*Primary Examiner* — Jai M Lee
(74) *Attorney, Agent, or Firm* — SZDC Law PC

(57) ABSTRACT

There is provided an optical network device (30) comprising separate downstream and upstream signal paths (33, 34) disposed between a wavelength division multiplexing unit (16) and a signal splitting element (32, 44, 50), an optical to electrical signal converter (18) disposed in the downstream path and an electrical to optical signal converter (22) disposed in the upstream path, wherein the signal splitting element (32, 44, 50) is capable of splitting signals independent of signal frequency and is configured with an isolation of 30 to 50 dB thereby to substantially prevent leakage of downstream signals into upstream path (34). The signal splitting element is capable of splitting signals independent of signal frequency and may be a directional coupler, two-way signal splitter or hybrid coupler comprising at least two different types of coupler element.

6 Claims, 3 Drawing Sheets

(56) References Cited

U.S. PATENT DOCUMENTS

| | | | |
|---|---|---|---|
| 10,211,922 B2* | 2/2019 | Mutalik | H04Q 11/0067 |
| 10,284,294 B2* | 5/2019 | Bush | H04Q 11/0071 |
| 10,476,601 B2* | 11/2019 | Gadkari | H04L 5/08 |
| 10,498,005 B2* | 12/2019 | Rijssemus | H01P 5/184 |
| 10,547,400 B2* | 1/2020 | Abramov | H04L 5/1461 |
| 10,566,994 B2* | 2/2020 | Hamzeh | H03M 3/424 |
| 10,651,958 B1* | 5/2020 | Sun | H01P 1/26 |
| 11,589,092 B2* | 2/2023 | Bonen | H04N 21/6168 |
| 11,616,632 B2* | 3/2023 | Bowler | H04L 5/14 |
| | | | 370/276 |
| 2010/0239251 A1 | 9/2010 | Biegert et al. | |
| 2012/0051734 A1* | 3/2012 | Weiss | H04B 10/0799 |
| | | | 398/9 |
| 2012/0106964 A1* | 5/2012 | Sniezko | H04B 10/25751 |
| | | | 398/67 |
| 2017/0054423 A1* | 2/2017 | Ariesen | H04N 7/102 |
| 2021/0211196 A1* | 7/2021 | Beas Bujanos | H04B 10/2575 |
| 2021/0341532 A1* | 11/2021 | Sun | G01R 31/2844 |

FOREIGN PATENT DOCUMENTS

| | | |
|---|---|---|
| WO | 2014186505 A1 | 11/2014 |
| WO | 2015063757 A1 | 5/2015 |

* cited by examiner

OPTICAL NETWORK DEVICE

This application claims priority to United Kingdom Patent Application No. GB 2108879.4, filed on Jun. 21, 2021, which is incorporated by reference for all purposes as if fully set forth herein.

FIELD OF THE INVENTION

This invention relates to an optical network device for use in cable television and broadband networks.

BACKGROUND TO THE INVENTION

In broadband networks often fiber optic networks require connecting to networks using coaxial cables. This is achieved using Radio Frequency over Glass Optical Network Units (R-ONU) which provide an interface between a Radio Frequency over Glass (RFoG) network and a coax network such as used in a CATV network. The R-ONU converts the optical RF over glass signals to electrical RF over coax signals for downstream signals and electrical RF over coax signals to optical RF over glass signals for upstream signals. R-ONU devices enable cable operators to deploy fibre-to-the-home and fibre-to-the-building networks.

In an R-ONU, a diplexer or diplex filter is used to isolate downstream signals passing from a headend of the network to a user from upstream signals returning from a user to the headend. The downstream circuit is connected to a high-pass part of the diplex filter, and the upstream circuit is connected to a low-pass part of the diplex filter. The frequency split of a diplex filter has a fixed value. This means that the R-ONU must be changed if the network operator decides to change the frequency split between upstream and downstream signals.

The frequency split between upstream and downstream signals is likely to be altered in the future to give homes a faster, more wideband upstream signal, such as with a frequency split of 200/250 MHz. However for each change in the frequency split, signal filters within the R-ONU need to be altered which can be time-consuming and expensive.

SUMMARY OF THE INVENTION

In accordance with the invention there is provided an optical network device comprising separate upstream and downstream signal paths disposed between a wavelength division multiplexing unit and a signal splitting element, an optical to electrical signal converter disposed in the downstream path and an electrical to optical signal converter disposed in the upstream path, wherein the signal splitting element is capable of splitting signals independent of signal frequency and is configured with an isolation of 30 to 50 dB, preferably an out-to-coupler isolation, thereby to substantially prevent leakage of downstream signals into upstream path.

Thus the wavelength division multiplexing unit is connected by way of separate upstream and downstream paths to a signal splitting element, with a downstream receiver connected between the wavelength division multiplexing unit and the signal splitting element in the downstream path and an upstream transmitter connected between the wavelength division multiplexing unit and signal splitting element in the upstream path. By having a signal splitting element capable of splitting signals independent of signal frequency, such an optical network device can remain in position in the network if the frequency split between downstream and upstream signals changes.

The signal splitting element may be a directional coupler.

Alternatively the signal splitting element may be a two-way signal splitter.

As yet another alternative, the signal splitting element may be a hybrid coupler comprising at least two different types of coupler element, and preferably such a hybrid coupler comprises a microstrip directional coupler in series with a ferrite directional coupler.

A low pass filter may optionally be disposed between the signal splitting element and the electrical to optical signal converter.

The optical network device preferably further comprises a first port connectable to a RFoG network and a second port connectable to a coaxial cable network.

The wavelength division multiplexing unit is preferably connected to the first port, with preferably the signal splitting element is connected to the second port.

The invention will now be described by way of example and with reference to the accompanying drawings in which.

DESCRIPTION

Figure 1:
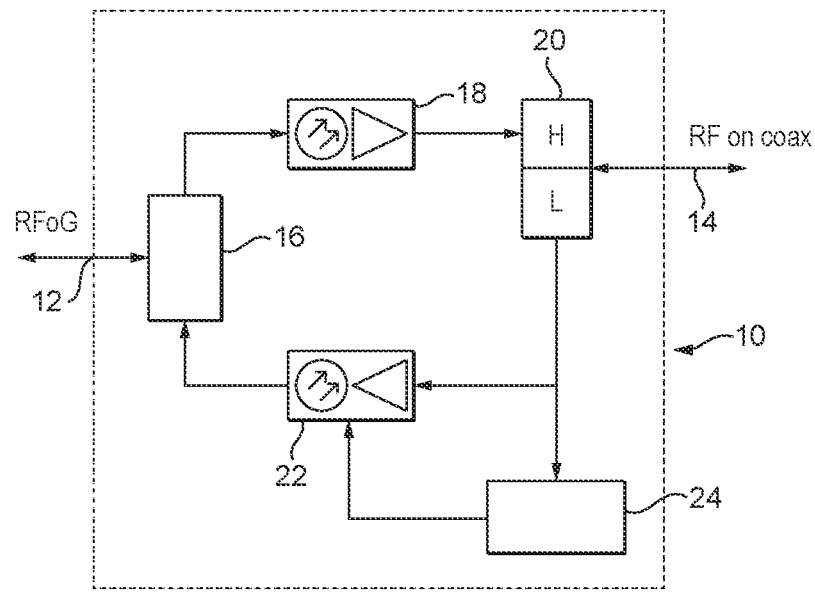
FIG. 1 shows a schematic diagram of a prior art optical network device.

A prior art optical network device 10 is shown in FIG. 1, this being a Radio Frequency over glass Optical Network Unit (R-ONU) configured for use in Radio Frequency over Glass (RFoG) networks and cable networks such as used for cable television (CATV).

R-ONU 10 is a bi-directional signal device comprising connection ports 12, 14 for connecting to the RFoG network and RF coax network respectively, with separate downstream and upstream signal paths for converting optical RF over glass signals to electrical RF over coax signals and vice versa.

Optical signals received at port 12 from a headend of the network (downstream signals) pass into wavelength division multiplexing unit 16 which separates or combines downstream and upstream optical signal frequencies depending on direction of travel. Optical signals from wavelength division multiplexing unit 16 are then converted into electrical RF signals at downstream receiver 18 and passed to diplex filter 20, passing through the high pass side of filter 20 to leave port 14 and continue downstream along the coaxial network to reach one or more users.

Upstream signals from the coaxial network pass from port 14 into the low pass side of diplex filter 20 and are passed to upstream transmitter 22 for conversion into optical signals, then being processed at wavelength division multiplexing unit 16 before leaving port 12 and returning upstream as optical signals along the RFoG network.

Signal detector 24 can be used to ensure upstream transmitter 22 only transmits for an appropriate upstream signal level, so reducing transmission of noise upstream.

When the split frequency between upstream and downstream signals changes, diplex filter 20 must be replaced to accommodate the altered frequency bands, and typically the entire R-ONU is replaced.

An optical network device being an improved R-ONU will now be disclosed where the downstream and upstream signals are isolated from each other with a frequency independent element. Such an R-ONU device can remain in position in the network if the frequency split between downstream and upstream signals changes.

Figure 2:
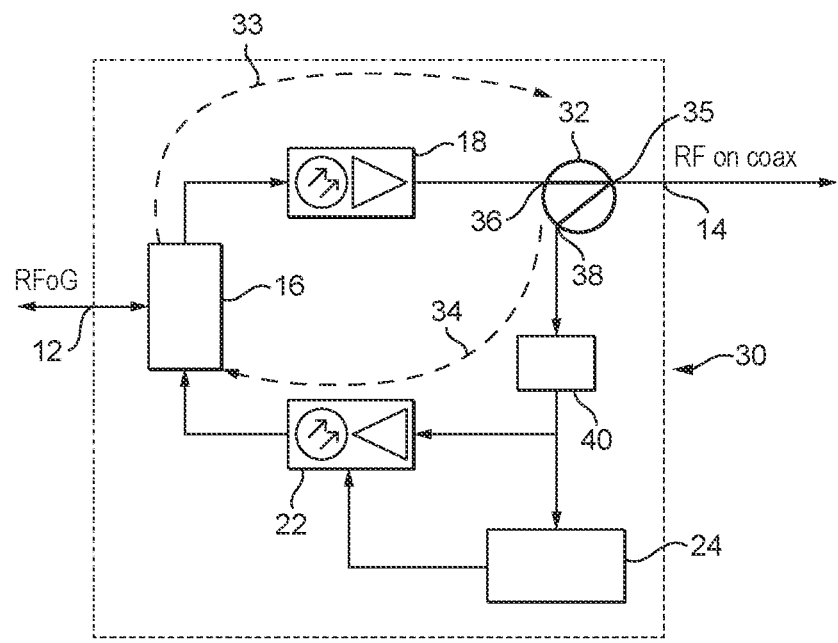
FIG. 2 shows a schematic diagram of a first embodiment of an optical network device in accordance with the present invention.

As shown in FIG. 2, R-ONU 30 replaces diplex filter 20 with a serial hybrid coupler 32 to isolate the downstream and upstream signal paths 33, 34 from each other. Downstream signal path 33 extends from wavelength division multiplexing unit 16 by way of downstream receiver 18 to coupler 32, with upstream signal path 34 extending from coupler 32 by way of upstream transmitter 22 to wavelength division multiplexing unit 16.

Coupler 32 is a directional coupler with higher out-to-coupler isolation than a standard ferrite or microstrip directional coupler. Such a coupler is frequency independent and can be used for all frequency splits of the network signals.

Directional coupler 32 comprises input 35 and outputs 36, 38, with input 35 connected to an RF coax connector at port 14. Output 36 is connected to downstream receiver 18 and output 38 is connected to upstream transmitter 22. To prevent leakage of the electrical downstream signal into upstream transmitter 22, the isolation of coupler 32 is configured to be high, typically at least 30 to 50 dB.

A low pass filter 40 can optionally be connected into the upstream signal path between output 38 and transmitter 22 to ensure any residual amounts of downstream signal leakage are prevented from entering the upstream signal path. Filter 40 typically has a filter frequency of 684 MHz, the maximum upstream frequency following the DOCSIS 4.0 standard. This filter adds extra isolation at higher frequencies, being the frequencies above crossover frequency of filter 40.

As with the prior art, a signal detector 24 can be used to ensure transmitter 22 is only active when the upstream signal is at a suitable level.

Figure 3:
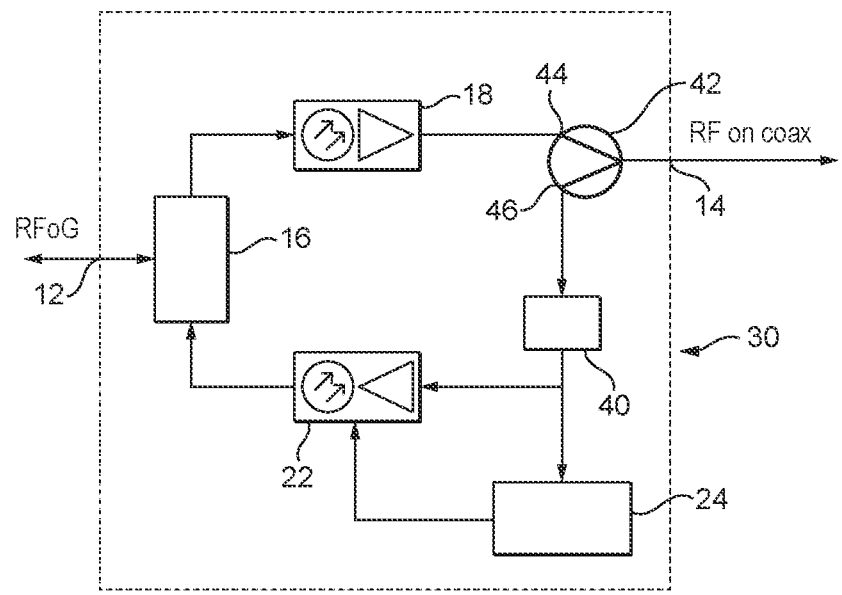
FIG. 3 shows a schematic diagram of a second embodiment.

Instead of using a directional coupler, a two-way signal splitter 42 can be used as shown in the second embodiment of FIG. 3, with splitter 42 having a high isolation of typically 30 to 50 dB between the output coupler ports 44, 46 to prevent leakage of the electrical downstream signal to upstream transmitter 22. Again optional low pass filter 40 can be used as for the embodiment of FIG. 2.

Figure 4:
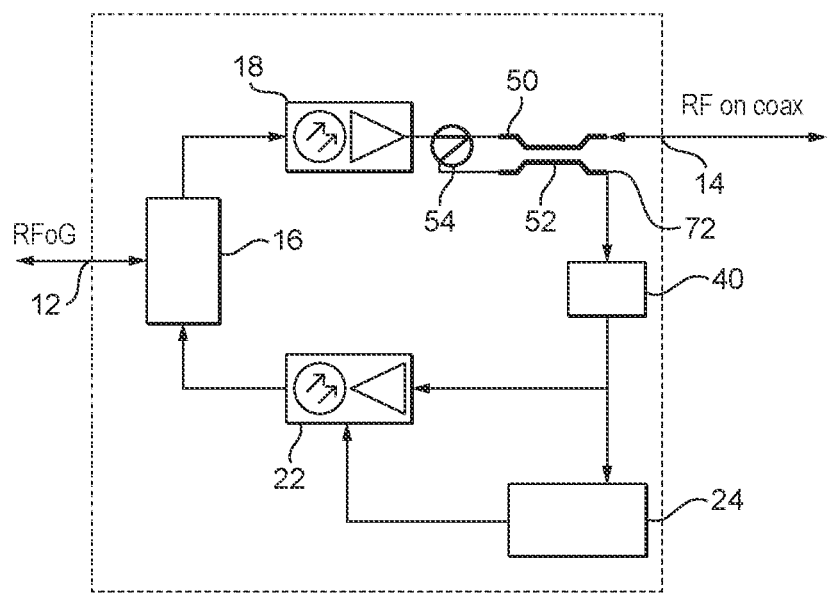
FIG. 4 shows a schematic diagram of the third embodiment.

A third embodiment is shown in FIG. 4 where serial hybrid coupler 50 in the form of a microstrip directional coupler 52 in series with a ferrite directional coupler 54 is used to split the upstream and downstream signals. The combination of these two types of directional coupler results in a high isolation between the output and coupling port and in a good coupling. One output 66 of serial directional coupler 50 is connected to downstream receiver 18 and another output 72 connected to upstream transmitter 22. Again optional low pass filter 40 can be used as for the embodiment of FIG. 2.

Figure 5:
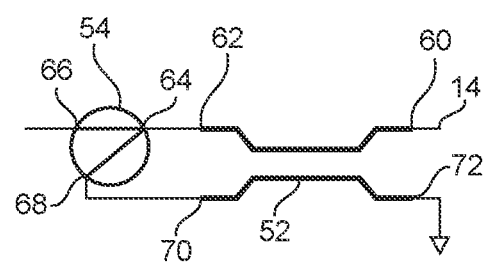
FIG. 5 shows a schematic diagram illustrating connection of components within the third embodiment.

FIG. 5 shows in detail how microstrip directional coupler 52 is connected to ferrite directional coupler 54. Output 62 of microstrip directional coupler 52 is connected to input 64 of ferrite directional coupler 54. Output 66 of ferrite directional coupler 54 is connected to the output of downstream receiver 18. Coupling port 68 of ferrite directional coupler 54 is connected to isolation port 70 of microstrip directional coupler 52. Input 60 of microstrip directional coupler 52 is connected an RF coax connector associated with port 14. Coupling port 70 of microstrip directional coupler 52 is connected to upstream transmitter 22, optionally by way of low pass filter 40 and signal detector 24.

Using such an optical network device as shown in FIGS. 2, 3, 4 and 5 avoids the need to change the optical network device when the frequency band split for upstream and downstream changes. Optical network device 30 is frequency independent and changes in frequency split can simply be accommodated without any intervention required to the optical network device.

The invention claimed is:

1. An optical network device comprising separate upstream and downstream signal paths disposed between a wavelength division multiplexing unit and a signal splitting element, an optical to electrical signal converter disposed in the downstream path and an electrical to optical signal converter disposed in the upstream path, wherein the signal splitting element is a hybrid coupler comprising a microstrip directional coupler in series with a ferrite directional coupler and is configured with a high isolation.

2. An optical network device according to claim 1, wherein the isolation is an out-to-coupler isolation.

3. An optical network device according to claim 1, wherein a low pass filter is disposed between the signal splitting element and the electrical to optical signal converter.

4. An optical network device according to claim 1, further comprising a first port connectable to a RFoG network and a second port connectable to a coaxial cable network.

5. An optical network device according to claim 4, wherein the wavelength division multiplexing unit is connected to the first port.

6. An optical network device according to claim 4, wherein the signal splitting element is connected to the second port.

* * * * *